(12) United States Patent
Ogusa et al.

(10) Patent No.: US 6,573,690 B2
(45) Date of Patent: Jun. 3, 2003

(54) FEEDBACK CONTROLLED POWER COMPENSATION APPARATUS

(75) Inventors: Shinichi Ogusa, Tokyo (JP); Naoki Morishima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/944,210

(22) Filed: Sep. 4, 2001

(65) Prior Publication Data

US 2002/0130639 A1 Sep. 19, 2002

(30) Foreign Application Priority Data

Mar. 19, 2001 (JP) ........................................ 2001-077814

(51) Int. Cl.[7] ................................................ G05F 1/70
(52) U.S. Cl. ....................................................... 323/207
(58) Field of Search ................................... 323/205, 207

(56) References Cited

U.S. PATENT DOCUMENTS

| 4,757,434 A | * | 7/1988 | Kawabata et al. ............ 363/41 |
| 5,646,511 A | * | 7/1997 | Akamatsu et al. .......... 323/207 |
| 5,790,396 A | * | 8/1998 | Miyazaki et al. ............. 363/96 |
| 6,407,536 B1 | * | 6/2002 | Ogusa ......................... 323/207 |

FOREIGN PATENT DOCUMENTS

JP 9-9509 A 1/1997

* cited by examiner

*Primary Examiner*—Adolf Deneke Berhane
(74) *Attorney, Agent, or Firm*—Leydig, Voit & Mayer, Ltd.

(57) ABSTRACT

A power conversion apparatus connected to an AC voltage system, including current control circuits provides individual feedback control of an active current and a reactive current. The active current control circuit changes control gain of the active current according to a detected active current value or a deviation of the detected active current value from an active current command value.

10 Claims, 9 Drawing Sheets

FEEDBACK CONTROLLED POWER COMPENSATION APPARATUS

BACKGROUND OF THE INVENTION

1. Technical Field

This invention relates to a power conversion apparatus used in a reactive power compensator connected to an electric power system.

2. Related Art

Figure 9:
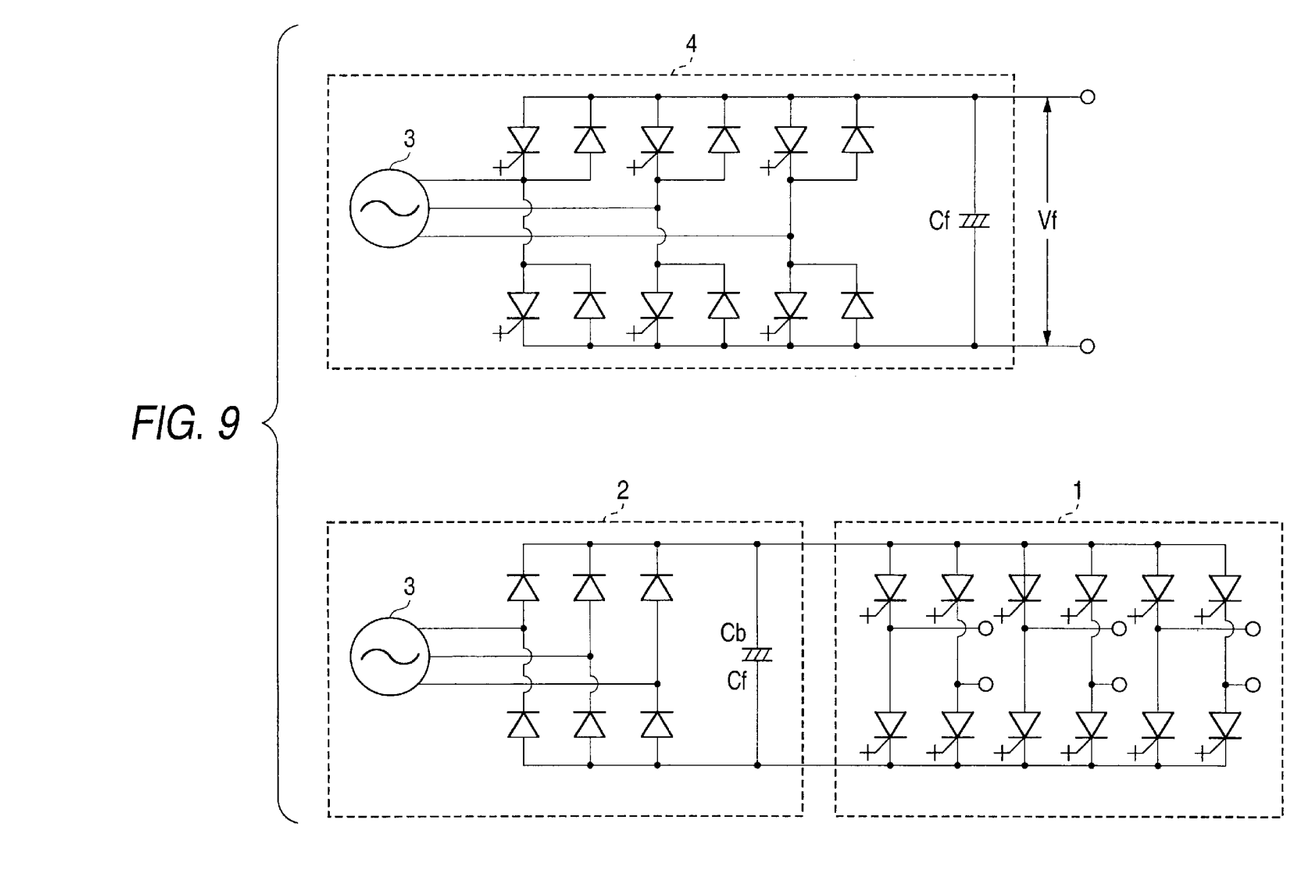
FIG. 9 is a configuration diagram showing a conventional power conversion apparatus.

In a self-commutated reactive power compensator, a DC voltage increases when electric power flows due to a fluctuation in an AC system. Particularly when a system fault occurs, a voltage of a fault phase instantaneously increases at the time of the fault clearance and an excessive active power flows. In a conventional power conversion apparatus, feedback control of active current and reactive current or a DC voltage of a converter is generally performed, so that an inflow of an active power from an AC system is suppressed and an increase in a DC capacitor voltage is suppressed, but when an AC system voltage instantaneously increases, for example, in case of clearing a system fault, in conventional control, response was slow resulting in an increase in a DC voltage. When a response of a converter control is set to a high speed, current control operates effectively at the time of an inflow of an active power to suppress the inflow of the active power and the increase in the DC capacitor voltage can be suppressed. However, when the response is set to a high speed thus, there was a problem that divergence or vibration generally occurred at the time of the current control due to conditions of the system or a configuration of the self-commutated reactive power compensator and operations become unstable, and there was a limit to which the response would be set to a high speed. As a result of that, the power flows into due to a delay of the control and the DC capacitor voltage of the self-commutated reactive power compensator increases. When the DC capacitor voltage reaches a protective level of a DC overvoltage because of protection of a switching device of the converter, a DC overvoltage protective circuit of the converter operates and the converter leads to a protective stop. When the converter leads to the protective stop due to the DC overvoltage, the converter stops until the DC capacitor discharges. At this time, the converter stops for a long time unless the DC capacitor can be rapidly discharged. FIG. 9 shows a DC capacitor of a self-commutated reactive power compensator and the charger disclosed in the Unexamined Japanese Patent Application No. Hei 9-9509. In FIG. 9, numerals 1, 4 are self-commutated converters, and numeral 2 is a diode converter, and numeral 3 is an AC power source. In the self-commutated reactive power compensator shown in FIG. 9, conventionally, charge has made for initial charge of a DC capacitor of the self-commutated converter 1 using the diode converter 2 and instead, by replacing the diode converter 2 with the self-commutated converter 4 and operating an inverse conversion of the self-commutated converter at the time of an increase in a DC voltage, a DC overvoltage has been suppressed to prevent the converter from leading to a protective stop.

3. Problems to be Solved

As described above, in the conventional power conversion apparatus, there was a case that a response of converter control was set to a high speed and a large inflow of active power due to a fluctuation in a system could not be suppressed, and in such a case, there was conventionally a method of connecting the self-commutated converter as shown in the Unexamined Japanese Patent Application No. Hei 9-9509 in order to suppress an increase in a DC voltage and prevent a protective stop of the converter. Also, in addition to such a method, there was a method of connecting a switch and a resistor in parallel with a DC capacitor and performing a chopper operation at the time of an increase in a DC voltage to discharge the DC capacitor, or a method of reducing a variation in a voltage to an inflow of electric power by increasing capacitance of a DC capacitor. However, in these methods, a device which is not used in normal operation is added or a part with extra specifications is used for a product in the normal operation, so that a problem that costs increase arises.

SUMMARY OF THE INVENTION

The invention is implemented to solve the problems as described above, and an object of the invention is to provide a power conversion apparatus in which a stable operation is normally performed without adding a device which is not used in normal operation or using a part with extra specifications in the normal operation and only at the time of an inflow of excessive electric power from a system due to a fluctuation in the system, control can be constructed so as to operate at a speed higher than that of normal control and a converter can be prevented from leading to a protective stop due to a DC overvoltage.

(Means for Solving the Problems)

A power conversion apparatus of the invention is a power conversion apparatus connected to an AC system, comprising a current control circuit capable of individually performing feedback control of an active current and a reactive current, characterized in that the current control circuit is constructed so as to change a control gain of the active current according to a detected active current value or a deviation of a detected active current value from an active current command value.

Also, a power conversion apparatus of the invention is characterized in that in the current control circuit, the control gain of the active current is increased to a value larger than a normal value only when an excessive active current with a predetermined value or more flows in a rise direction of a DC voltage of a converter.

Also, a power conversion apparatus of the invention is a power conversion apparatus connected to an AC system, comprising a voltage control circuit capable of performing feedback control of a DC voltage of a converter, characterized in that the voltage control circuit is constructed so as to change a control gain of the DC voltage according to a detected DC voltage value or a deviation of a detected DC voltage value from a DC voltage command value.

Also, a power conversion apparatus of the invention is characterized in that in the voltage control circuit, the control gain of the DC voltage is increased to a value larger than a normal value only when the detected DC voltage value is a predetermined value or more.

Also, a power conversion apparatus of the invention is a power conversion apparatus connected to an AC system, comprising a current control circuit capable of individually performing feedback control of an active current and a reactive current, characterized in that according to a detected active current value or a deviation of a detected active current value from an active current command value, it is constructed so as to add a predetermined modulation factor bias to a normal modulation factor and output a voltage pulse signal to a converter.

Also, a power conversion apparatus of the invention is a power conversion apparatus connected to an AC system, comprising a voltage control circuit capable of performing feedback control of a DC voltage of a converter, characterized in that according to a detected DC voltage value or a deviation of a detected DC voltage value from a DC voltage command value, it is constructed so as to add a predetermined modulation factor bias to a normal modulation factor and output a voltage pulse signal to the converter.

Also, a power conversion apparatus of the invention is a power conversion apparatus connected to an AC system, comprising a voltage control circuit capable of performing feedback control of a DC voltage of a converter and means for detecting an AC system fault, characterized in that during the continuation of the AC system fault, it is constructed so as to decrease a DC voltage command value in the voltage control circuit.

Also, a power conversion apparatus of the invention is a power conversion apparatus connected to an AC system, comprising a voltage control circuit capable of performing feedback control of a DC voltage of a converter and means for detecting an AC system fault in the AC system, characterized in that during the continuation of the AC system fault and during a period of the time set after a clearance of the AC system fault, it is constructed so as to set an integral term of the voltage control circuit to zero when an absolute value of a deviation of a detected DC voltage value from a DC voltage command value becomes smaller than a setting value.

DETAILED DESCRIPTION OF THE PREFERRED EMBODIMENTS

[Mode for Carrying out the Invention]
(First Embodiment)

A first embodiment of the invention will be described below using the accompanying drawings.

Figure 1:
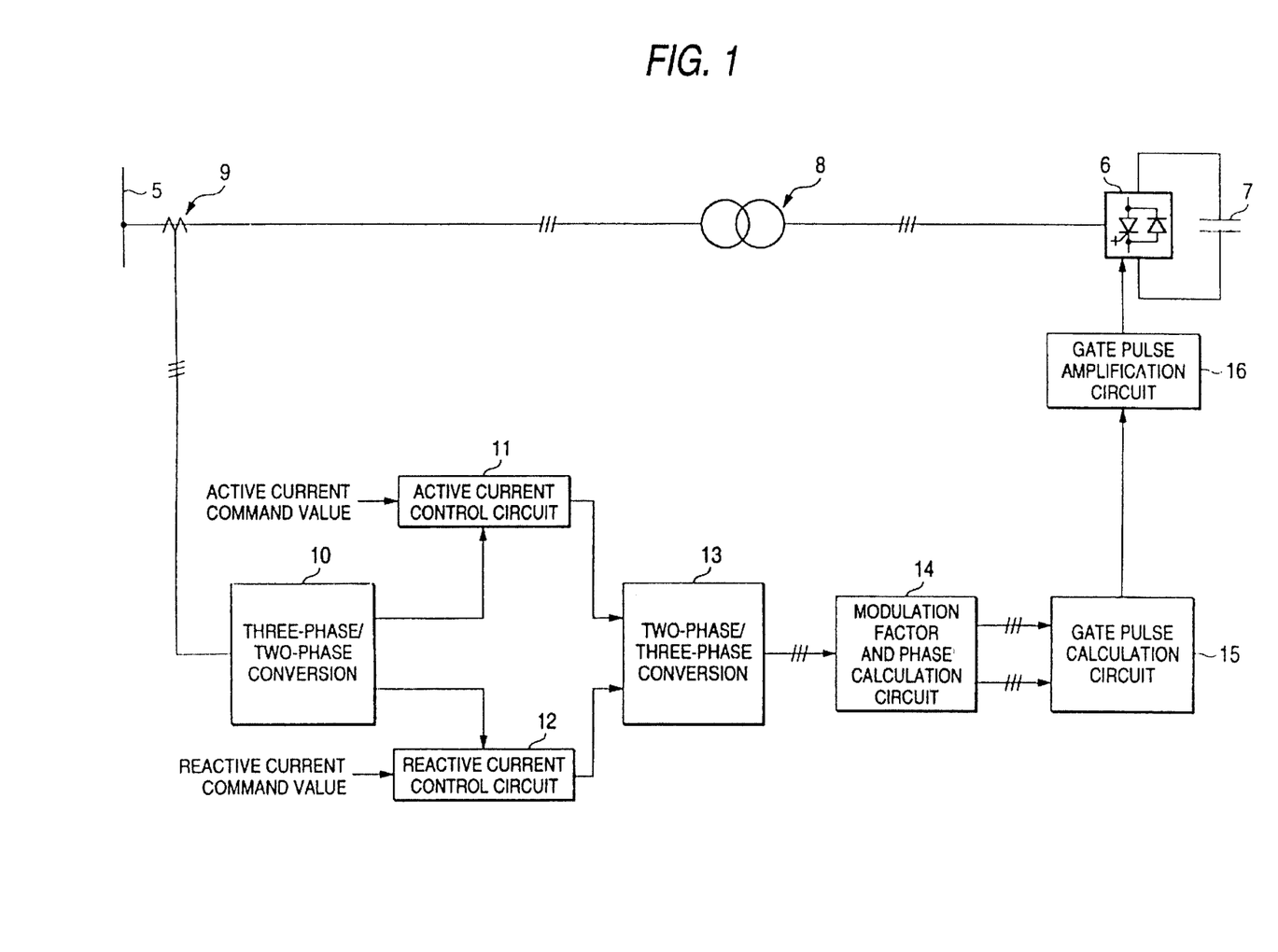
FIG. 1 is a configuration diagram showing a power conversion apparatus according to a first embodiment of the invention.

FIG. 1 is a configuration diagram showing a power conversion apparatus according to the first embodiment of the invention. In the drawing, numeral 5 is an AC system, and numeral 6 is a self-commutated converter, and numeral 7 is a DC capacitor of the converter 6, and numeral 8 is a transformer, and numeral 9 is a current sensor for detecting an electric current flowing into the converter 6 from the system 5, and numeral 10 is a three-phase/two-phase conversion circuit for performing calculation to make conversions into an active current and a reactive current based on the electric current measured by the current sensor 9, and numeral 11 is an active current control circuit for changing a gain according to a deviation of the converted active current from an active current command value and performing feedback control of the active current, and numeral 12 is a reactive current control circuit for performing feedback control of the reactive current from a reactive current command value and the reactive current calculated by the three-phase/two-phase conversion circuit 10, and numeral 13 is a two-phase/three-phase conversion circuit for converting a two-phase voltage signal outputted by the active current control circuit 11 and the reactive current control circuit 12 into a three-phase voltage signal, and numeral 14 is a modulation factor and phase calculation circuit for calculating a modulation factor and a phase from the three-phase voltage signal outputted by the two-phase/three-phase conversion circuit 13, and numeral 15 is a gate pulse calculation circuit for calculating a gate pulse signal given to a switching device of the self-commutated converter 6 from the modulation factor and the phase of the three-phase voltage signal calculated by the modulation factor and phase calculation circuit 14, and numeral 16 is a gate pulse amplification circuit for amplifying the gate pulse signal calculated by the gate pulse calculation circuit 15.

Next, operations will be described.

In FIG. 1, an electric current flowing from the AC voltage system 5 is detected by the current sensor 9, and the detected current is converted into an active current and a reactive current by the three-phase/two-phase conversion circuit 10. The active current and the reactive current are respectively compared with command values in the active current control circuit 11 and the reactive current control circuit 12 to perform feedback control. In case that a voltage of the AC system 5 increases due to a system fault, a large active power flows into the self-commutated converter 6 and a voltage of the DC capacitor 7 increases and at this time in the embodiment, a gain of the active current control circuit 11 is changed and feedback control of the active current is speedily performed. That is, after clearing a fault such as the system fault, the large active power flows into and a deviation of the active current from an active current command value becomes larger than that of a normal value. In only the case that this deviation increases to a predetermined value or more in a rise direction of a DC voltage, namely only the case that the active current flows in a direction in which a voltage (DC voltage of the converter 6) of the DC capacitor 7 rises to a predetermined value or more, the gain of the active current control circuit 11 is increased to a value higher than a normal value. In this manner, an in flow of the excessive active power can be suppressed speedily and the self-commutated converter 6 can be prevented from leading to a protective stop due to a DC overvoltage.

Figure 2:
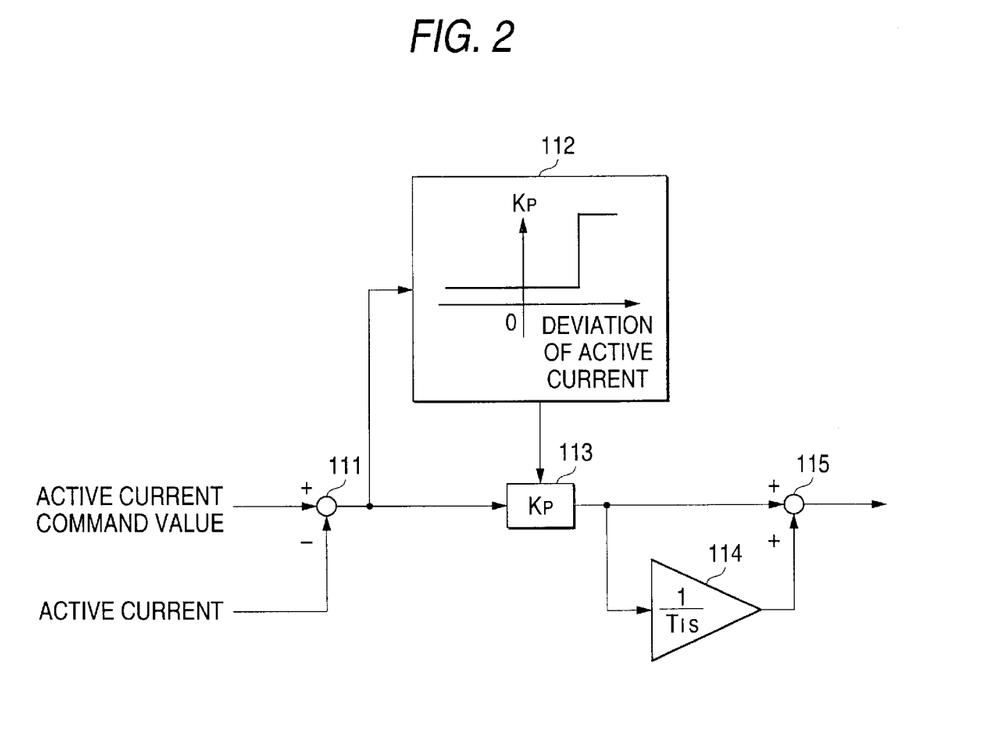
FIG. 2 is a configuration diagram showing an active current control circuit according to the first embodiment of the invention.

FIG. 2 is a configuration diagram showing the active current control circuit 11 according to the first embodiment in the case that an electric current flowing from the converter 6 to the system 5 is positive. In the drawing, numeral 111 is a subtracter for calculating an active current deviation of the active current from an active current command value, and numeral 112 is a gain setting device for stepwise changing a value of a gain Kp according to the deviation, and for example, when the deviation from the active current command value is 5% or more, the gain is set so as to become 20 times larger than the original value. Numeral 113 is a gain for multiplying the deviation outputted by the subtracter 111 by a value set by the gain setting device 112, and numeral 114 is an integrator for integrating an output of the gain 113, and numeral 115 is an adder for calculating a sum of an output from the gain 113 and an output from the integrator 114.

Incidentally, in the embodiment, a parameter for determining the gain is performed by the deviation of the detected active current from the active current command value, but a method of changing a gain of active current control according to a detected active current value using only the detected active current value as a parameter may be adopted.

Also, in the embodiment, a one-stage form according to the deviation is shown in a change in the gain, but a multi-stage form may be used or a change may be made continuously.

Also, in FIG. 1, the current sensor 9 measures an electric current of the system side of the transformer 8, but may detect an electric current of the converter side of the transformer 8 or directly an electric current outputted by the converter 6.

Also, constants may be set in the active current command value and the reactive current command value of FIG. 1, and in a form having a voltage control loop of the converter 6, a method of determining a current command value based on the output of voltage control.

(Second Embodiment)

Figure 3:
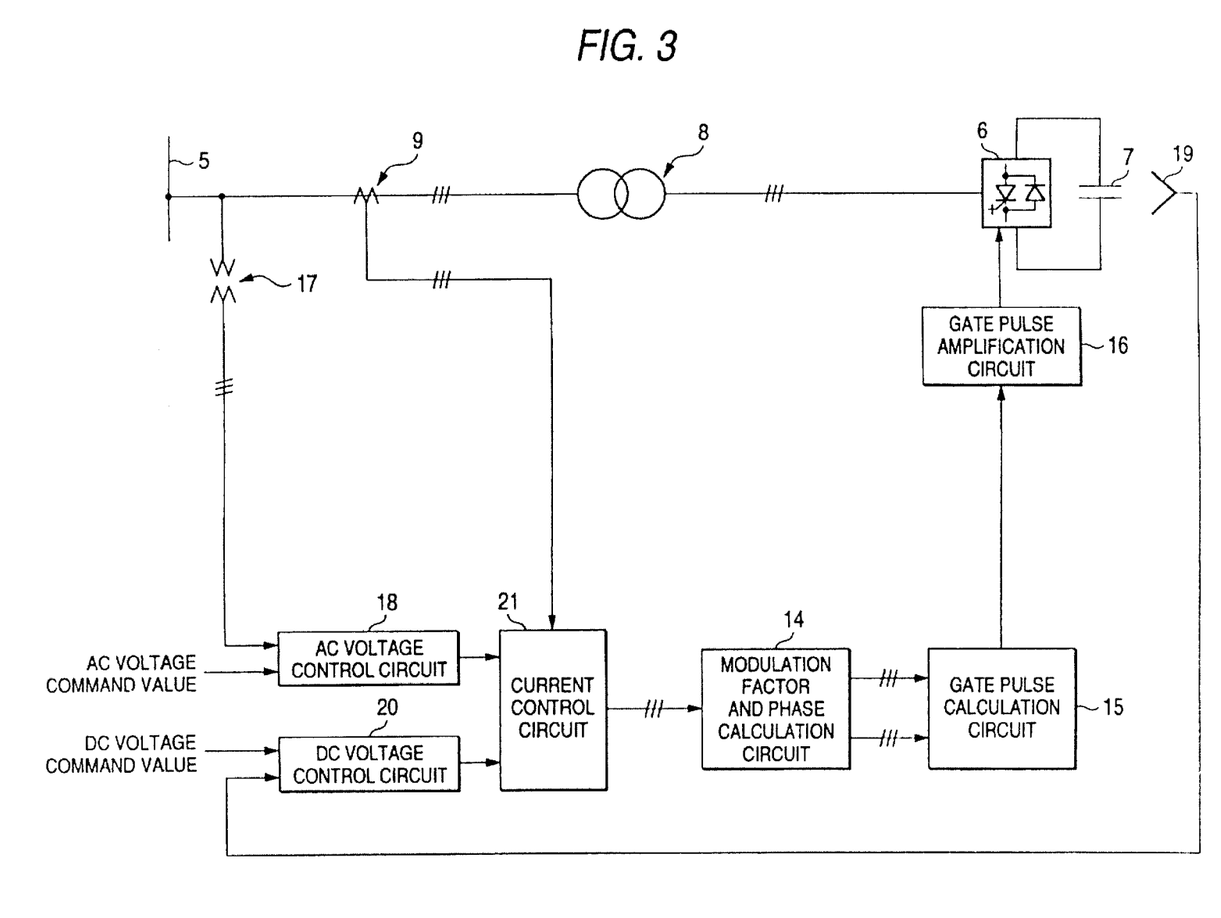
FIG. 3 is a configuration diagram showing a power conversion apparatus according to a second embodiment of the invention.

FIG. 3 is a configuration diagram showing a power conversion apparatus according to a second embodiment of the invention. In the drawing, a description is omitted in portions common to FIG. 1. Numeral 17 is an AC voltage sensor for detecting an AC voltage of a system, and numeral 18 is an AC voltage control circuit for performing feedback control of the AC voltage based on the AC voltage measured by the AC voltage sensor 17 and an AC voltage command value, and numeral 19 is a DC voltage sensor for detecting a voltage (DC voltage of the converter 6) of the DC capacitor 7, and numeral 20 is a DC voltage control circuit for changing a gain according to a deviation of the DC capacitor voltage measured by the DC voltage sensor 19 from a DC capacitor voltage command value and performing feedback control of the DC capacitor voltage, and numeral 21 is a current control circuit for performing current control from outputs of the AC voltage control circuit 18, the DC voltage control circuit 20 and the current sensor 9 for detecting an electric current flowing into the converter 6 from the system 5.

Next, operations will be described.

In case that a voltage of the AC voltage system 5 fluctuates due to a system fault, an electric current higher than a current command value flows in the self-commutated converter 6 due to a delay in control. As a result of that, a fluctuation in a voltage of the DC capacitor 7 occurs. Particularly at the time of clearing the fault, due to an increase in the voltage of the AC voltage system 5, excessive active power flows into the self-commutated converter 6 and the voltage of the DC capacitor 7 increases. Hence, the voltage of the DC capacitor 7 is detected by the DC voltage sensor 19 and in the DC voltage control circuit 20, a deviation of the detected voltage value of the DC capacitor 7 from a DC voltage command value is calculated and only when the deviation is plus, namely the detected voltage value of the DC capacitor 7 is larger than the DC voltage command value and a size of the deviation becomes a predetermined value or more, a gain of the DC voltage control circuit 20 is increased to a value higher than a normal value. Thus, an increase in the DC capacitor voltage can be suppressed speedily and the converter can be prevented from leading to a protective stop due to a DC overvoltage.

Figure 4:
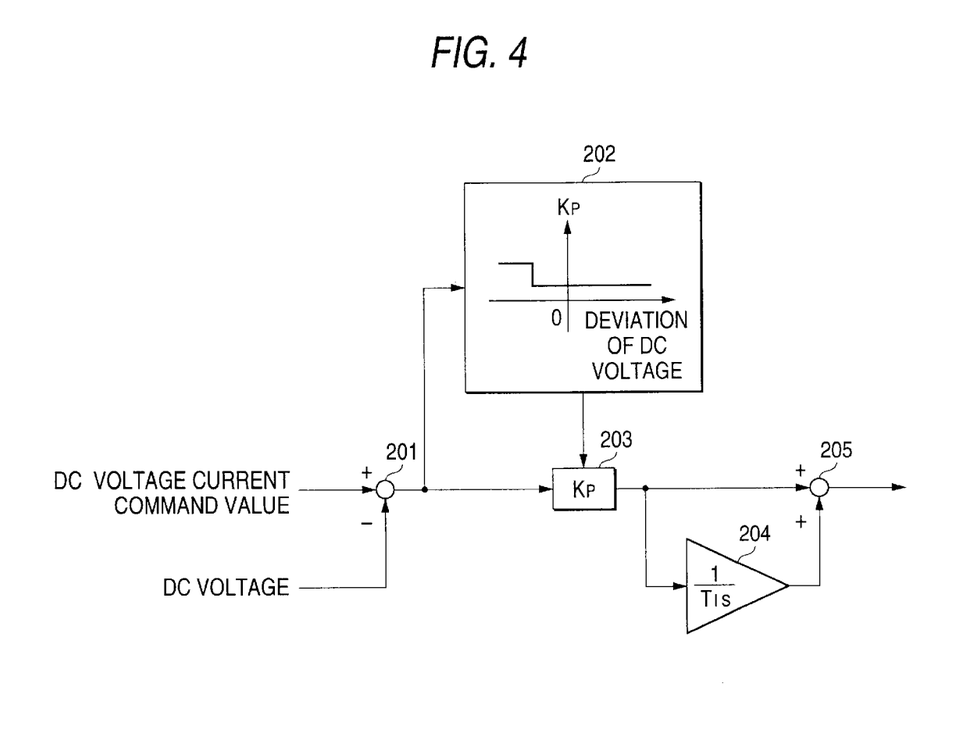
FIG. 4 is a configuration diagram showing a DC voltage control circuit according to the second embodiment of the invention.

FIG. 4 is a configuration diagram showing the DC voltage control circuit 20 according to the second embodiment. In the drawing, numeral 201 is a subtracter for calculating a deviation of the detected voltage of the DC capacitor 7 from a DC voltage command value, and numeral 202 is a gain setting device for stepwise changing a value of a gain Kp according to the deviation, and for example, when the deviation from the DC voltage command value is −5% or less, the gain is set so as to become two times larger than the original value. Numeral 203 is a gain for multiplying the deviation outputted from the subtracter 201 by a value set by the gain setting device 202, and numeral 204 is an integrator for integrating an output of the gain 203, and numeral 205 is an adder for calculating a sum of an output from the gain 203 and an output from the integrator 204.

Incidentally, in the embodiment, a parameter for determining the gain is performed by the deviation of the detected voltage of the DC capacitor from the DC voltage command value, but a method of changing a gain of DC voltage value control according to a detected DC voltage value using only the detected voltage value of the DC capacitor as a parameter may be adopted.

Also, in the embodiment, a one-stage form according to the deviation is shown in a change in the gain, but a multi-stage form may be used or a change may be made continuously.

Also, in FIG. 3, the AC voltage sensor 17 measures a voltage of the system side of the transformer 8, but may measure a voltage of the converter side of the transformer 8.

Also, the current sensor 9 measures an electric current of the system side of the transformer 8, but may detect an electric current of the converter side of the transformer 8 or directly an electric current outputted by the converter 6.

(Third Embodiment)

Figure 5:
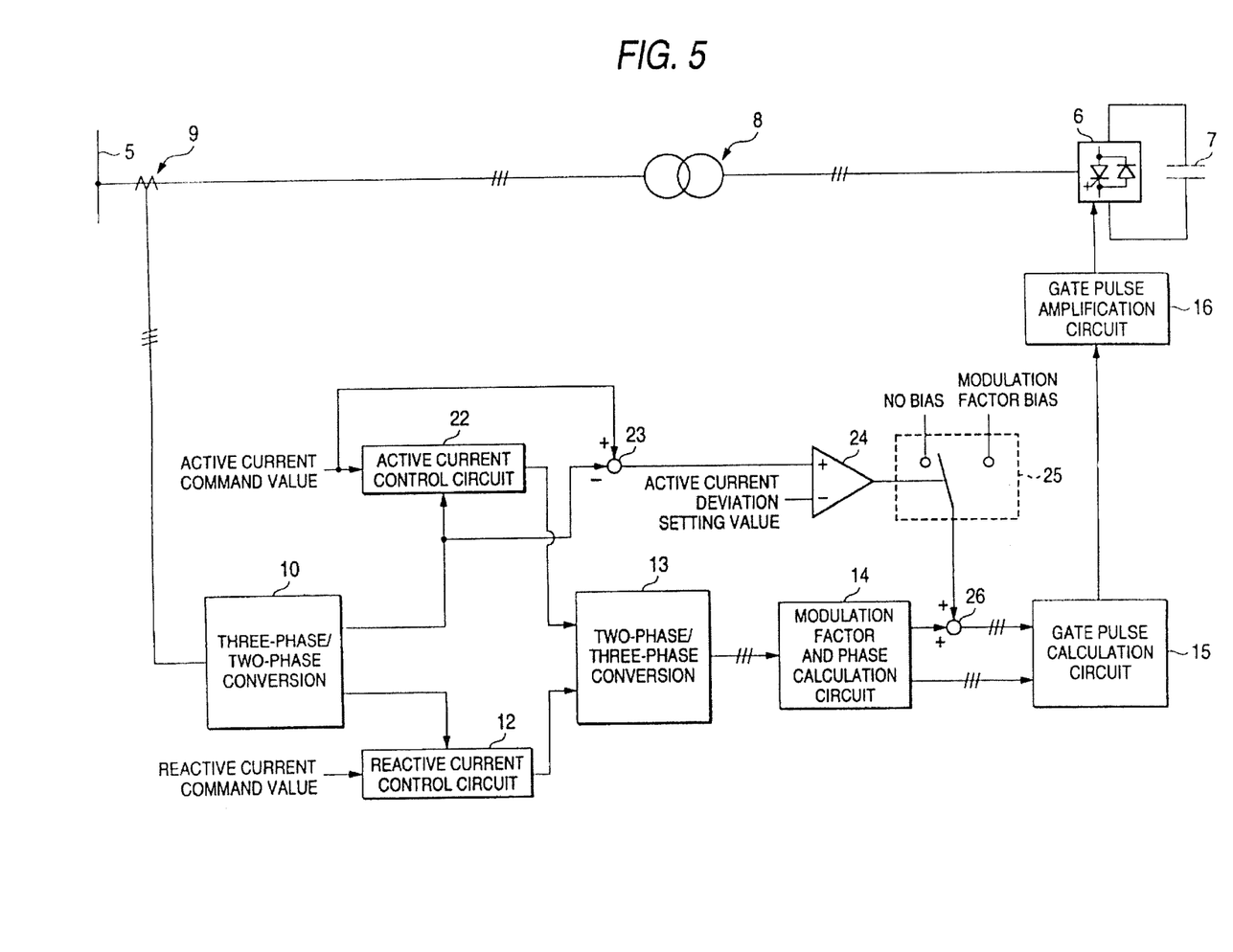
FIG. 5 is a configuration diagram showing a power conversion apparatus according to a third embodiment of the invention.

FIG. 5 is a configuration diagram showing a power conversion apparatus according to a third embodiment of the invention. In the drawing, a description is omitted in portions common to FIG. 1. Numeral 22 is an active current control circuit for performing feedback control of an active current from an active current command value and the active current calculated by the three-phase/two-phase conversion circuit 10, and numeral 23 is a subtracter for calculating a deviation of the converted active current from the active current command value, and numeral 24 is a comparator for comparing the active current deviation calculated by the subtracter 23 with an active current deviation setting value, and numeral 25 is a switching circuit for switching a bias amount added to a modulation factor between a zero bias and a predetermined bias amount according to a value outputted by the comparator 24, and numeral 26 is an adder for adding an output of the switching circuit 25 to a modulation factor outputted by the modulation factor and phase calculation circuit 14.

Next, operations will be described.

In FIG. 5, an electric current flowing from the AC voltage system 5 is detected by the current sensor 9, and the detected current is converted into an active current and a reactive current by the three-phase/two-phase conversion circuit 10. The active current and the reactive current are respectively compared with command values in the active current control circuit 22 and the reactive current control circuit 12 to perform feedback control by a fixed gain. In case that a voltage of the AC system 5 increases due to an AC system fault, a large active power flows into the self-commutated converter 6 and a voltage of the DC capacitor 7 increases and in the embodiment, a deviation of the converted active current from an active current command value is calculated in the subtracter 23 and the calculated active current deviation is compared with the active current deviation setting value in the comparator 24. The active current deviation setting value compared in the comparator 24 is set to a value capable of detecting the fact that the active current deviation increases in a direction in which a DC voltage of the converter 6 rises to a predetermined value or more, and when the active current deviation increases to the active current deviation setting value or more, it is switched so as to output a predetermined modulation factor bias (normally, a bias which becomes the maximum modulation factor) by the switching circuit 25 and in the adder 26, the modulation factor bias is added to a modulation factor outputted by the modulation factor and phase calculation circuit 14 to output it to the gate pulse calculation circuit 15 and a gate pulse signal is calculated by the gate pulse calculation circuit 15. In the converter 6, by instantaneously outputting a voltage higher than the primarily outputted voltage by a signal from the gate pulse amplification circuit 16, electric power flows from the converter to the AC system and a DC voltage of the DC capacitor 7 can be reduced instantaneously. In this manner, the converter 6 can be prevented from leading to a protective stop due to a DC overvoltage.

Incidentally, in the embodiment, the deviation of the active current detected value from the active current command value is used as a parameter for determining the presence or absence of a bias added to a modulation factor, but the active current detected value maybe used or it may be determined whether or not the bias is added to the modulation factor depending on whether the active current detected value is larger than a predetermined value or not.

Also, in the embodiment, a one-stage form according to the deviation is shown in a bias amount added to the modulation factor, but a multi-stage form may be used or a change may be made continuously.

Also, in the embodiment, the current sensor 9 measures an electric current of the system side of the transformer 8, but may detect an electric current of the converter side of the transformer 8 or directly an electric current outputted by the converter 6.

(Fourth Embodiment)

Figure 6:
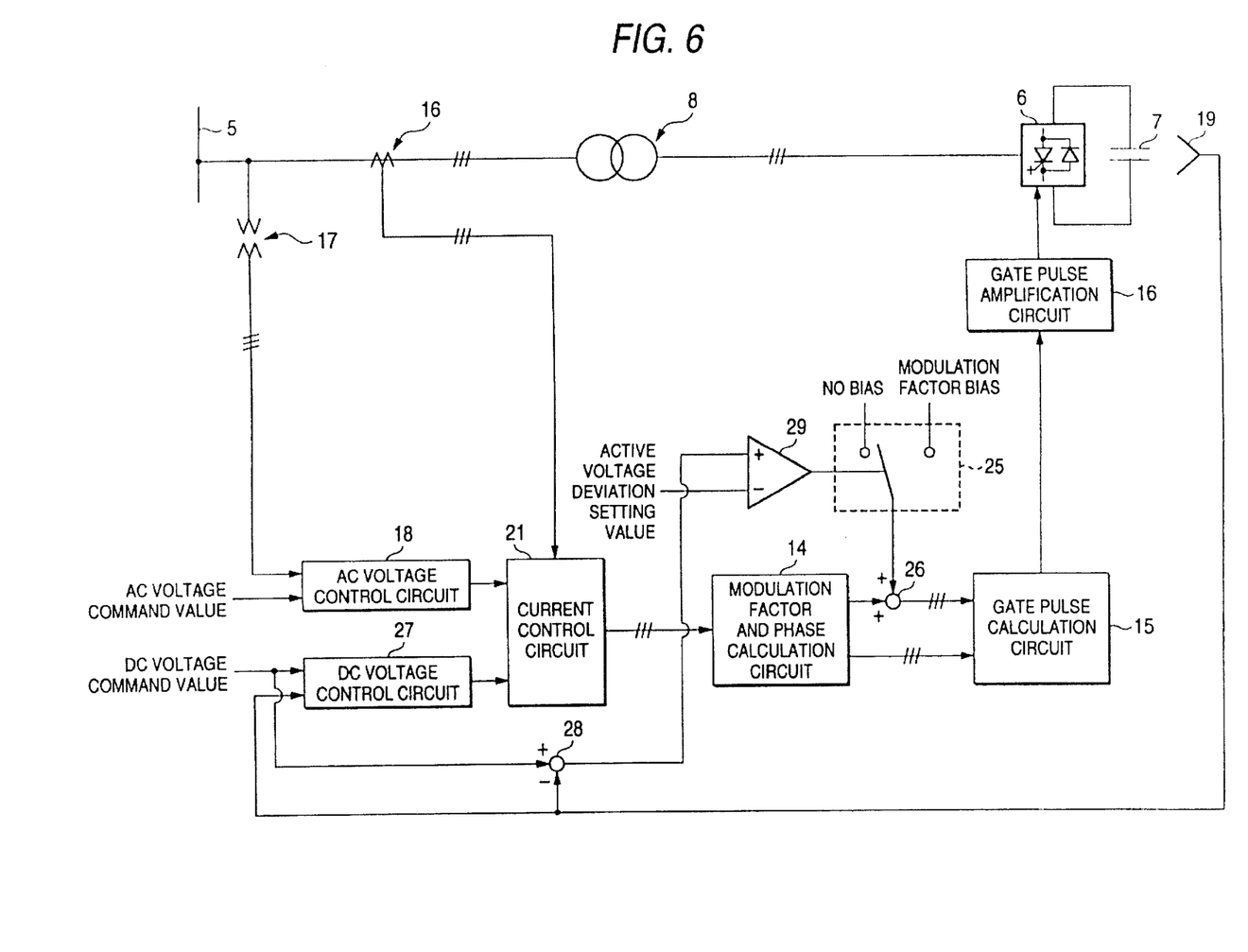
FIG. 6 is a configuration diagram showing a power conversion apparatus according to a fourth embodiment of the invention.

FIG. 6 is a configuration diagram showing a power conversion apparatus according to a fourth embodiment of the invention. In the drawing, a description is omitted in portions common to FIGS. 3 and 5. Numeral 27 is a DC voltage control circuit for performing feedback control of a DC capacitor voltage based on the DC capacitor voltage measured by the DC voltage sensor 19 and a DC capacitor voltage command value, and numeral 28 is a subtracter for calculating a deviation of the DC capacitor voltage detected value detected by the DC voltage sensor 19 from the DC voltage command value, and numeral 29 is a comparator for comparing the DC voltage deviation calculated by the subtracter 28 with a DC voltage setting value.

Next, operations will be described.

In case that a voltage of the AC voltage system 5 fluctuates due to an AC system fault, an electric current higher than a current command value flows in the self-commutated converter 6 due to a delay in control. As a result of that, a fluctuation in a voltage of the DC capacitor 7 occurs. Particularly at the time of clearing the fault, due to an increase in the voltage of the AC system 5, excessive active power flows into the self-commutated converter 6 and the voltage of the DC capacitor 7 increases and in the embodiment, a deviation of the voltage value of the DC capacitor 7 detected by the DC voltage sensor 19 from a DC voltage command value is calculated in the subtracter 28 and the calculated DC voltage deviation is compared with a DC voltage deviation setting value in the comparator 29. When the deviation from the DC voltage command value increases due to a rise in the DC capacitor voltage and increases to the DC voltage deviation setting value or more, it is switched so as to output a predetermined modulation factor bias (normally, a bias which becomes the maximum modulation factor) by the switching circuit 25 and in the adder 26, the modulation factor bias is added to a normal modulation factor outputted by the modulation factor and phase calculation circuit 14 to output it to the gate pulse calculation circuit 15 and a gate pulse signal is calculated by the gate pulse calculation circuit 15. In the converter 6, by instantaneously outputting an output voltage higher than the primarily outputted voltage from the converter 6 by a signal from the gate pulse amplification circuit 16, electric power flows from the converter and a DC voltage of the DC capacitor 7 can be reduced instantaneously. In this manner, the converter 6 can be prevented from leading to a protective stop due to a DC overvoltage.

Incidentally, in the embodiment, the deviation of the DC capacitor voltage detected value from the DC voltage command value is used as a parameter for determining the presence or absence of a bias added to a modulation factor, but the detected value of the DC capacitor voltage may be used as it is.

Also, in the embodiment, a one-stage form according to the deviation is shown in a bias amount added to the modulation factor, but a multi-stage form may be used or a change may be made continuously.

Also, in the embodiment, the AC voltage sensor 17 may measure a voltage of the system side of the transformer 8, or may measure a voltage of the converter side of the transformer 8.

Also, the current sensor 9 measures an electric current of the system side of the transformer 8, but may detect an electric current of the converter side of the transformer 8 or directly an electric current outputted by the converter 6.

(Fifth Embodiment)

Figure 7:
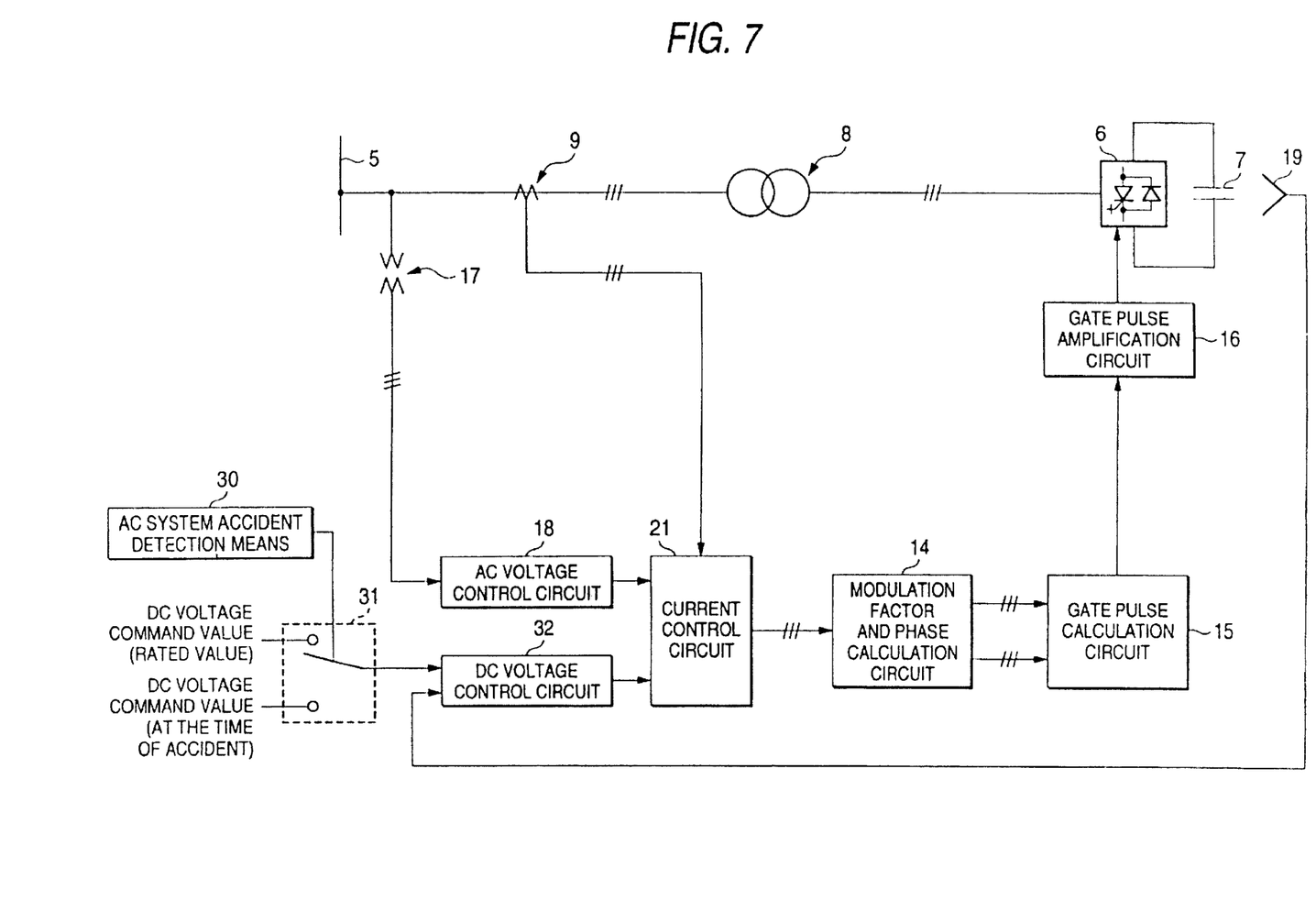
FIG. 7 is a configuration diagram showing a power conversion apparatus according to a fifth embodiment of the invention.

FIG. 7 is a configuration diagram showing a power conversion apparatus according to a fifth embodiment of the invention. In the drawing, a description is omitted in portions common to FIG. 2. Numeral 30 is AC system fault detection means, and numeral 31 is a switching circuit for switching between a DC voltage command value of rating and a DC voltage command value at the time of fault according to an output of the AC system fault detection means 30. Numeral 32 is a DC voltage control circuit and as the control method, for example, control by a general fixed gain or control by a variable gain similar to that of the second embodiment may be used.

Next, operations will be described.

When the system fault detection means 30 detects a system fault, a DC voltage command value is decreased to a value set lower than a rating by the switching circuit 31 during the continuation of the system fault. By this, a DC capacitor voltage is reduced and thus a margin increases with respect to a DC overvoltage level, so that the converter can be prevented from leading to a protective stop due to a DC overvoltage.

Incidentally, the AC voltage sensor 17 may measure a voltage of the system side of the transformer 8, or may measure a voltage of the converter side of the transformer 8.

Also, the current sensor 9 measures an electric current of the system side of the transformer 8, but may detect an electric current of the converter side of the transformer 8 or directly an electric current outputted by the converter 6.

(Sixth Embodiment)

Figure 8:
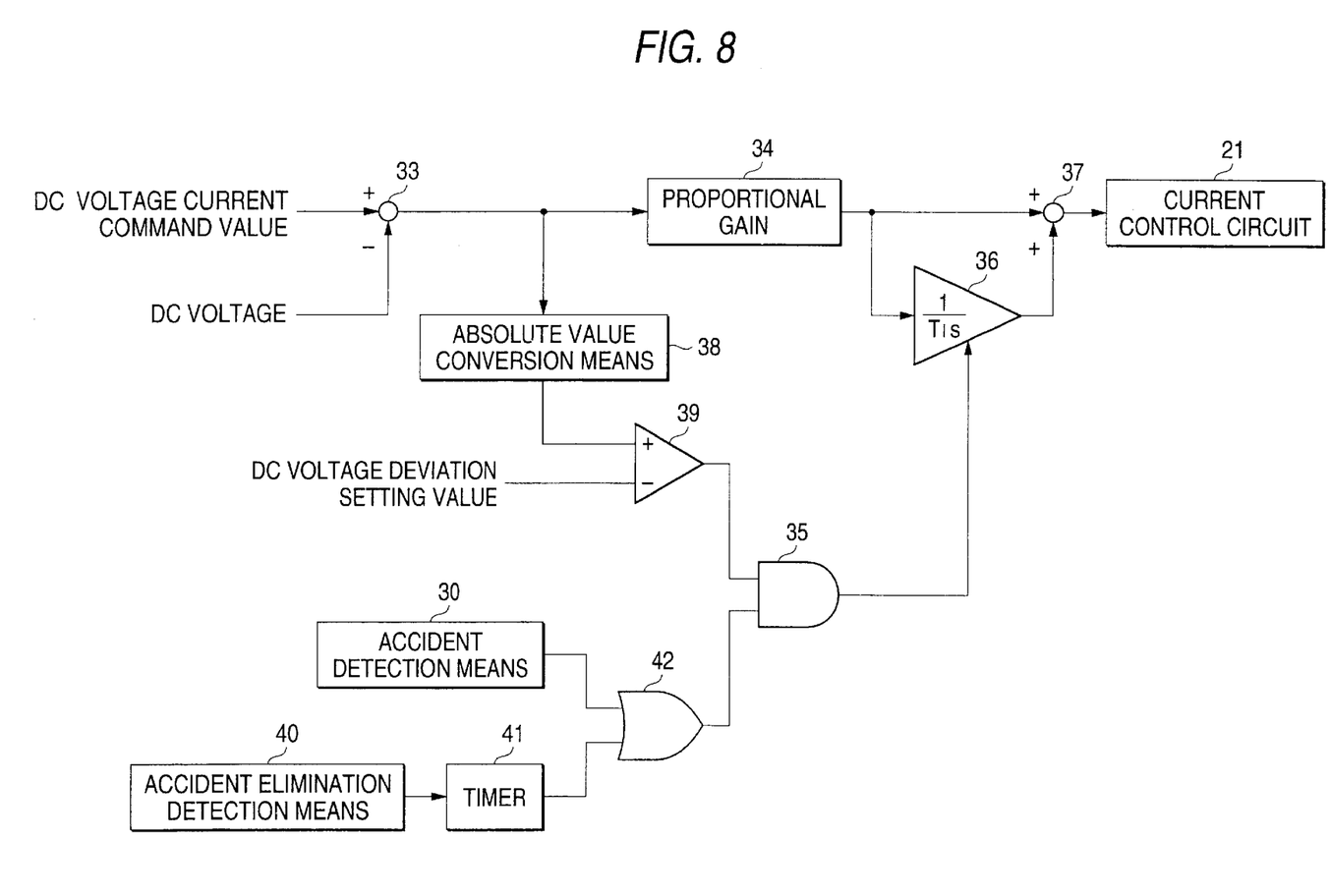
FIG. 8 is a configuration diagram showing a DC voltage control circuit according to a sixth embodiment of the invention.

FIG. 8 is a configuration diagram showing a main part of a power conversion apparatus according to a sixth embodiment of the invention, and is a configuration diagram showing a DC voltage control circuit of the power conversion apparatus. In the drawing, numeral 33 is a subtracter for calculating a deviation of a detected value of a DC capacitor voltage from a DC voltage command value, and numeral 34 is a proportional gain for multiplying an output of the subtracter 33 by a gain, and numeral 36 is an integrator having a function of integrating an output of the proportional gain 34 and a function of resetting an output to zero according to an output of a logical product 35 described later, and numeral 37 is an adder for calculating a sum of an output of the proportional gain 34 and an output of the integrator 36, and numeral 38 is absolute value conversion means for taking an absolute value of an output of the subtracter 33, and numeral 39 is a comparator for comparing an output of the absolute value conversion means 38 with a DC voltage error setting value, and numeral 30 is fault detection means for detecting an AC voltage system fault, and numeral 40 is fault clearance detection means for detecting a clearance of the AC system fault, and numeral 41 is a timer for maintaining time set at the time when the fault clearance detection means 40 detects the fault clearance and a signal of the fault clearance, and numeral 35 is a logical product of a logical sum 42 of an output of the fault detection means 30 and the timer 41 and an output of the comparator 39.

Next, operations will be described.

When the system fault detection means 30 detects a system fault, a fault detection signal continues to be outputted from the system fault detection means 30 during the continuation of the system fault. While this fault detection signal is outputted, a deviation of a DC capacitor voltage detected value from a DC voltage command value is calculated by the subtracter 33 and a conversion into an absolute value is made by the absolute value conversion means 38 and when this value is smaller than a setting value, an integral term of DC voltage control is reset to zero. Also, during a period of the time set by the timer 41 after the fault clearance detection means 40 detects the fault clearance, an integral term of DC voltage control is reset to zero when an absolute value of a deviation of the DC voltage detected value from the DC voltage command value becomes smaller than a set value. Thus, the DC capacitor voltage fluctuates due to the system fault and a value remains in the integral term of the DC voltage control and the DC voltage control vibrates to reach a DC overvoltage level, so that the converter can be prevented from leading to a protective stop.

Incidentally, the proportional gain 34 may be a fixed gain or a variable gain for changing a value by the deviation used in the second embodiment.

(Effect of the Invention)

As described above, in accordance with the invention, there is provided a power conversion apparatus connected to an AC system, comprising a current control circuit capable of individually performing feedback control of an active current and a reactive current, characterized in that the current control circuit is constructed so as to change a control gain of the active current according to a detected active current value or a deviation of a detected active current value from an active current command value, so that control operates at a speed higher than a normal speed in case that excessive electric power flows from the AC system due to a fluctuation in the AC system, with the result that a converter can be prevented from leading to a protective stop due to a DC overvoltage.

Also in accordance with the invention, in the current control circuit, the control gain of the active current is increased to a value larger than a normal value only when an excessive active current with a predetermined value or more flows in a rise direction of a DC voltage of a converter, so that a converter can be prevented from leading to a protective stop due to a DC overvoltage without adding a device which is not used in normal operation or using a device with extra specifications in the normal operation.

Also in accordance with the invention, there is provided a power conversion apparatus connected to an AC system, comprising a voltage control circuit capable of performing feedback control of a DC voltage of a converter, characterized in that the voltage control circuit is constructed so as to change a control gain of the DC voltage according to a detected DC voltage value or a deviation of a detected DC voltage value from a DC voltage command value, so that control operates at a speed higher than a normal speed in case that excessive electric power flows from the system due to a fluctuation in the AC system, with the result that a converter can be prevented from leading to a protective stop due to a DC overvoltage.

Also in accordance with the invention, in the voltage control circuit, the control gain of the DC voltage is increased to a value larger than a normal value only when the detected DC voltage value is a predetermined value or more, so that a converter can be prevented from leading to a protective stop due to a DC overvoltage without adding a device which is not used in normal operation or using a part with extra specifications in the normal operation.

Also in accordance with the invention, there is provided a power conversion apparatus connected to an AC system, comprising a current control circuit capable of individually performing feedback control of an active current and a reactive current, characterized in that according to a detected active current value or a deviation of a detected active current value from an active current command value, it is constructed so as to add a predetermined modulation factor bias to a normal modulation factor and output a voltage pulse signal to a converter, so that an outflow of electric power from the converter is caused to reduce a DC voltage and the converter can be prevented from leading to a protective stop due to a DC overvoltage.

Also in accordance with the invention, there is provided a power conversion apparatus connected to an AC system, comprising a voltage control circuit capable of performing feedback control of a DC voltage of a converter, characterized in that according to a detected DC voltage value or a deviation of a detected DC voltage value from a DC voltage command value, it is constructed so as to add a predetermined modulation factor bias to a normal modulation factor and output a voltage pulse signal to the converter, so that an outflow of electric power from the converter is caused to reduce a DC voltage and the converter can be prevented from leading to a protective stop due to a DC overvoltage.

Also in accordance with the invention, there is provided a power conversion apparatus connected to an AC system, comprising a voltage control circuit capable of performing feedback control of a DC voltage of a converter and means for detecting a system fault in the AC system, characterized in that during the continuation of the system fault, it is constructed so as to decrease a DC voltage command value in the voltage control circuit, so that even in case that excessive electric power flows into the converter from the AC system, a DC overvoltage protective level is not reached and the converter can be prevented from leading to a protective stop due to a DC overvoltage.

Also in accordance with the invention, there is provided a power conversion apparatus connected to an AC system, comprising a voltage control circuit capable of performing feedback control of a DC voltage of a converter and means for detecting an AC system fault, characterized in that during the continuation of the system fault and during a period of the time set after a clearance of the AC system fault, it is constructed so as to set an integral term of the voltage control circuit to zero when an absolute value of a deviation of a detected DC voltage value from a DC voltage command value becomes smaller than a setting value, so that in case that a DC voltage fluctuates due to a fluctuation in the system and DC voltage control vibrates, the converter can be prevented from leading to a protective stop due to a DC overvoltage.

What is claimed is:

1. A power conversion apparatus connected to an AC system, comprising:
    a self-commutated power converter connected to and receiving power from an AC system; and
    a feedback control system controlling operation of said self-commutated power converter in response to clearance of a fault on the AC system, the feedback control system including
        a current sensor for sensing current flowing to said self-commutated power converter from the AC system,
        a phase converter for converting the current sensed into an active current and a reactive current,
        a current control circuit receiving the active current and having a gain varying with one of deviation of the active current from an active current command value and the active current, and
        a modulation and phase control circuit generating control signals, based on the gain of said current control circuit, supplied to and controlling said self-commutated power converter, thereby suppressing an excessive increase in power flowing to said self-commutated power converter upon clearance a fault in the AC system.

2. The power conversion apparatus as defined in claim 1, wherein said current control circuit increases the gain to a value larger than a normal value only when the active current at least equals a threshold current in a rise direction of a DC voltage of said self-commutated power converter.

3. The power conversion apparatus as defined in claim 1, wherein, in response to one of the active current and the deviation, a modulation factor bias produced by said modulation and phase circuit is added to a normal modulation factor to provide the control signal to said self-commutated power converter.

4. The power conversion apparatus as defined in claim 1, wherein said current control circuit includes a subtracter for producing the deviation.

5. A power conversion apparatus connected to an AC system, comprising:
    a self-commutated power converter connected to and receiving power from an AC system; and
    a feedback control system controlling operation of said self-commutated power converter in response to clearance of a fault on the AC system, the feedback control system including
        a voltage sensor for sensing a DC voltage of said self-commutated power converter,
        a voltage control circuit receiving the DC voltage of said self-commutated power converter and having a gain varying with one of deviation of the DC voltage of said self-commutated power converter from a DC voltage command value and the DC voltage sensed, and
        a modulation and phase control circuit generating control signals, based on the gain of said voltage control circuit, supplied to and controlling said self-commutated power converter, thereby suppressing an excessive increase in power flowing to said self-commutated power converter upon clearance a fault in the AC system.

6. The power conversion apparatus as defined in claim 2, wherein said voltage control circuit increases the gain to a value larger than a normal value only when the DC voltage sensed at least equals a threshold voltage.

7. The power conversion apparatus as defined in claim 5, wherein, in response to one of the DC voltage sensed and the deviation, a modulation factor bias produced by said modulation and phase circuit is added to a normal modulation to provide the control signal to said self-commutated power converter.

8. The power conversion apparatus as defined in claim 5, wherein said voltage control circuit includes a subtracter for producing the deviation.

9. A power conversion apparatus connected to an AC system, comprising:
    a voltage control circuit providing feedback control of a DC voltage of a converter;
    a subtracter for obtaining a deviation of a detected DC voltage from an active voltage command value, said voltage control circuit changing a control gain applied to the DC voltage according to one of the detected DC voltage and the deviation of the detected DC voltage from a DC voltage command value; and
    means for detecting a system fault in the AC system, wherein, during continuation of the system fault, a DC voltage command value is decreased in said voltage control circuit.

10. A power conversion apparatus connected to an AC system, comprising:
    a voltage control circuit providing feedback control of a DC voltage of a converter;
    a subtracter for obtaining a deviation of a detected DC voltage value from an active voltage command value, said voltage control circuit changing a control gain applied to the DC voltage according to one of the detected DC voltage and the deviation of the detected DC voltage from a DC voltage command value; and
    means for detecting a system fault in the AC system, wherein, during continuation of the system fault and during a period of time after clearance of the system fault, an integral term of said voltage control circuit is set to zero when absolute value of the deviation of the detected DC voltage value from the DC voltage command value is smaller than a set value.

* * * * *